United States Patent [19]

Hirschfeld

[11] Patent Number: 4,542,987
[45] Date of Patent: Sep. 24, 1985

[54] TEMPERATURE-SENSITIVE OPTRODE

[75] Inventor: Tomas B. Hirschfeld, Livermore, Calif.

[73] Assignee: Regents of the University of California, Berkeley, Calif.

[21] Appl. No.: 473,306

[22] Filed: Mar. 8, 1983

[51] Int. Cl.⁴ .......................... G01J 5/08; G01N 21/64
[52] U.S. Cl. ...................................... 356/44; 374/131; 374/161
[58] Field of Search ................... 250/227; 356/43, 44; 374/130, 131, 132, 133, 161; 350/96.15, 96.18

[56] References Cited

U.S. PATENT DOCUMENTS

| | | | |
|---|---|---|---|
| 3,626,758 | 12/1971 | Stewart et al. | 356/44 X |
| 4,016,761 | 4/1977 | Rozzell et al. | 356/44 |
| 4,075,493 | 2/1978 | Wickersheim | 356/44 |
| 4,179,927 | 12/1979 | Saaski | 356/44 |
| 4,215,275 | 7/1980 | Wickersheim | 356/44 |
| 4,245,507 | 1/1981 | Samulski | 356/44 X |
| 4,302,970 | 12/1981 | Snitzer et al. | 374/161 |
| 4,380,365 | 4/1983 | Gross | 350/96.18 |
| 4,437,772 | 3/1984 | Samulski | 356/44 X |
| 4,456,330 | 6/1984 | Bludau | 350/96.18 |

FOREIGN PATENT DOCUMENTS 2067288 7/1981 United Kingdom ............... 374/131

OTHER PUBLICATIONS

Wickersheim et al., "Recent Advances in Optical Measurement", *Industrial Research and Development*, 12-1979.
Borman, "Optrodes", *Analytic Chemistry*, 12-1981.
Koechner, *Solid-State Laser Engineering*, Chapter 2, 1976.
"Remote Fiber Fluorimetric Analysis", *Energy and Technology in Review*, 7-1980, Hirschfeld.

Primary Examiner—Vincent P. McGraw
Assistant Examiner—S. A. Turner
Attorney, Agent, or Firm—Stephen C. Macevicz; Shyamala T. Rajender

[57] ABSTRACT

Method and apparatus are provided for measuring temperature and for generating optical signals related to temperature. Light from a fiber optic is directed to a material whose fluorescent response varies with ambient temperature. The same fiber optic delivering the excitation beam also collects a portion of the fluorescent emission for analysis. Signal collection efficiency of the fiber optic is enhanced by requiring that the fluorescent probe material be in the shape of an oblong parabolically tapered solid. Reproducibility is enhanced by using Raman backscatter to monitor excitation beam fluctuations, and by using measurements of fluorescence lifetime.

22 Claims, 10 Drawing Figures

TEMPERATURE-SENSITIVE OPTRODE

BACKGROUND OF THE INVENTION

The United States Government has rights in this invention pursuant to Contract No. W-7405-ENG-48 between the U.S. Department of Energy and the University of California, for the operation of Lawrence Livermore National Laboratory.

This invention relates generally to temperature sensing, and more particularly, to optical means for remote temperature sensing, especially in harsh or inaccessible environments.

Temperature sensing and control are crucial in a variety of situations arising in medicine, industrial operations, and scientific research. However, in many cases, temperature measurements must be conducted remotely because the processes or machinery to be monitored is inaccessible or involves hazardous components, such as, high pressures, high radiation levels, high intensity magnetic or electrical fields, corrosive materials, or the like.

In medicine the need for temperature monitoring arises in several contexts. Cardiac output and blood flow rates are measured by the thermal dilution method, wherein a bolus of room temperature solution is injected into a vein and blood temperature changes are monitored by one or more temperature sensing devices located down stream. For accurate measurements, it is desirable to use sensors with frequency responses greater than the major frequency components of the arterial pressure pulse, i.e., faster than about 20-30 Hz. In operations involving artificial hypothermia, such as heart and neurological cases, temperature monitoring is critical. Accurate temperature monitoring is also critical where local hyperthermia is induced as a means of cancer therapy. The differences between normal cells and malignant cells in their sensitivities to thermal killing is often no more than a few tenths of a degree. The presence of metallic sensors greatly complicates temperature control in this mode of therapy as the presence of such sensors can alter the thermal characteristics of the tissue in which they are imbedded. Furthermore, electromagnetic heating of tissues causes special difficulties: electromagnetic interference is induced in the thermometry electronics, excessive and artifactual heating occurs in sensors constructed of resistive material (both thermistors and themocouples), and sensors, especially those contained in highly conductive (and hence reflective) shields, perturb the electromagnetic fields used for heating. Thus, application of metallic, electrically-based temperature sensors presents significant problems: reduced accuracy due to noise and inadequate frequency response, and direct electrical hazard to the patient, especially when more than one sensor is employed.

In industrial process control the most common techniques for temperature measurement utilize thermocouples, thermistors, and resistance thermometers. These devices generate electrical signals which are amplified and then converted into temperature readings or employed in control functions. Frequently, these devices are impractical because the process is inaccessible, too hazardous, or too corrosive for in situ placement of sensors. For example, temperature monitoring of nuclear reactor vessels and coolant systems, underground nuclear waste-disposal sites, chemical dumping sites, working zones of coal-liquefaction reactors, oil refinery processes, and like processes, all involve conditions which make the use of standard electrically-based sensors difficult or impractical.

Many of the above-mentioned difficulties with current information-gathering technology can be overcome by using remote, in situ optical probes coupled to a detector by optical waveguides, or fiber optics. Fiber optics are durable, corrosion-resistant, heat-resistant, impervious to electrical or magnetic interference, and are available in very small diameters, which make them amenable for use with miniature probes.

In particular, optically-based probes generating fluorescent signals modulated by ambient conditions are well suited for use with optical fibers. However, a major drawback with such probes is that fluorescent intensity depends not only on ambient conditions but also an excitation beam intensity, which even when generated by a stabilized laser source can have a short term drift as high as 2 percent.

Wickersheim in U.S. Pat. No. 4,075,493, dated Feb. 21, 1978 discloses a device which utilizes fiber optics and which senses temperature by monitoring fluorescent emission line intensity ratios of certain phosphors. Wickersheim teaches the use of a class of oxysulfide-phosphor materials characterized by the formula (RE)-$_2O_2S$:X, wherein RE is lanthanum, godolinium, or yttrium, and X is selected from a specified group of rare earth elements. Wickersheim further teaches the use of these phosphors in the form of fine crystalline powders held by a nitrocellulose or silicate binder. The oxysulfide powders limit the applicability of the Wickersheim device. Unless sheathed in a protective coating the oxysulfides are susceptible to oxidizing in a strongly oxydizing environment and to reduction in a strongly reducing environment. Practical application of the apparatus for remote sensing requires that the phosphor emission lines be closely spaced so that frequency dependent fiber optic transmission losses do not affect the signal.

As recognized in the art the use of powders causes orders of magnitude reduction in the optical efficiency of the temperature probe. First, the density of the crystalline powder held by a binder is only about 50 percent that of the pure crystal. Second, the thermal insulation interposed by a binder material and protective sheath, and the powdered nature of the sensor prevents the frequency response of the probe from being any better than about a Hertz. And finally, phosphor excitation and signal collection efficiencies are greatly reduced because scattering from grain boundaries in the powder disperses the excitation beam, causes light loss, and makes the emitted fluorescence hard to collect within the limited fiber diameter.

Samulski in U.S. Pat. No. 4,245,507, dated Jan. 20, 1981 mentions the use of three distinct fluorescent phenomena for measuring temperature: intensity, emission line frequency shifts, and lifetime. Intensity, when measured alone, leads to the least reproducible temperature determinations, because it varies with excitation beam strength as well as temperature. Emission line frequency shifts do not depend on excitation beam strength, but they are difficult to measure since the shifts are typically small (on the order of a few tenths of a nanometer wavelength change per 100° C.), and are often associated with considerable broadening, even over relatively narrow temperature ranges (e.g., 50°–100° C.).

The foregoing illustrates the limitations of the current technology. It is apparent that it would be advantageous to provide an alternative to available methods, particularly in regard to remote temperature sensing apparatus.

SUMMARY OF THE INVENTION

It is therefore an object of this invention to provide an optical method and apparatus for remote temperature sensing in hostile or inaccessible environments, wherein information-bearing optical signals are internally calibrated by Raman scattered light generated by the fiber optic transmitting the information-bearing optical signals.

Another object of this invention is to provide a fiber optic sensor for high-speed remote measurement of temperature.

Another object of this invention is to provide a corrosion resistant temperature probe with high optical efficiency, suitable for use with communications-type, small diameter fiber optics, hundreds of meters or more in length.

Still another object of this invention is to provide a fluorescence-based temperature probe, utilizing fiber optics, which is chemically more impervious and optically more efficient than those that current technology provides.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

These and other objects are attained in accordance with the present invention wherein, generally, there is provided a fiber optic and at least one associated light source for illuminating a suitable fluorescent solid attached to the end of the fiber optic. The associated light source delivers light to a first end of the fiber optic which, in turn, transmits the light to its other, or second, end where the attached fluorescent solid is illuminated and caused to fluoresce. The same fiber optic delivering light from the associated light source also collects and transmits fluorescent light from the fluorescent solid back to a detection means for analysis. For accurate temperature measurements in remote and chemically hostile environments it is critical that the temperature probe be optically efficient, in that a maximal amount of light energy delivered to the probe is recollected as fluorescent signal; that the optical signal be independent of the intensity of the illuminating beam from the associated light source; and that the probe be constructed of a corrosion-resistant fluorescent solid with high thermal conductivity.

In accordance with the present invention, the fluorescent solid used in the temperature probe must be used in the form of a single piece of material, e.g., a single crystal or a single piece of suitably doped glass. The material must be suitable for the transmission of the illumination beam and fluorescent signal with minimal loss or diffusion, especially by scatter that would occur, for example, in material that was in granular or powdered form.

Fluorescent signal collection efficiency is further enhanced, in accordance with the present invention, by providing the fluorescent solid in a shape which is radially symmetric about a longitudinal axis and whose surface is tapered along the longitudinal axis. Preferentially, the face of the wide end of the tapered solid is optically smooth and is perpendicular to the longitudinal axis. This end, hereinafter referred to as the proximal end, has substantially the same diameter as the fiber optic core and is attached to the end face of the fiber optic core. This shape allows a greater fraction of fluorescence being emitted from any point within the solid to be collected and transmitted by the fiber optic than would be the case with a cylindrical-shaped solid.

In accordance with the invention, means are provided for precisely monitoring the intensity of the illumination beam impinging on the fluorescent solid and for measuring fluorescent signals generated by the fluorescent solid which are independent of variations in illumination beam strength. Unless such means are employed accuracy is severely limited by short term photometric drift in the output of the light source and possible misalignments in the optic system. Measuring the intensity of Raman scattered light produced by the fiber optic core is a means employed by the subject invention for monitoring illumination beam intensity. Another means involves monitoring the ratio of intensities of multiple fluorescent emission lines and correlating the ratio, instead of the intensities themselves with temperature. The use of fluorescence lifetime instead of intensity also avoids errors due to power fluctuations and optical system misalignments.

In accordance with the invention, the class of suitable fluoresent solids are selected with particular regard to their durability, their ability to resist corrosion, and their ability to conduct heat, which is critical for high-response time applications. Several solid-state laser materials fulfill these criteria far better than fluorescent materials currently being employed in remote temperature sensing technology. Ruby probes fabricated from sapphire fibers, in accordance with the present invention, are particularly well suited for high-speed temperature measurements in harsh environments.

A sapphire fiber whose tip has been doped by exposure to $Cr_2O_3$ and $Fe_2O_3$ vapors in accordance with the invention is particularly well suited for high speed temperature sensing. Here fluorescence lifetime, and therefore response delay, is reduced by the quenching effect of the iron.

Since the invention employs optical signals in a manner analogous to the use of electrical signals in electrodes, the sensor is referred to as an optrode, the descriptor "optrode" being derived from its electrical analogue.

The present invention is addressed to problems associated with remote temperature monitoring in hostile or inaccessible regions. It advantageously overcomes many of these problems by combining rugged, high quality fiber optics with simple in situ probes for generating optical signals related to ambient temperature. The problem of increasing the response time of probes is overcome by providing small probes made of materials, e.g., ruby, with extremely high thermal conductivity. The problem of low signal collection efficiency is overcome by providing a probe consisting of a single, integral piece of material having a maximally efficient shape for fluorescent collection. The problem of reduced reproducibility due to illumination beam fluctuations is overcome by monitoring beam intensity by Raman scatter generated by the fiber optic core.

Furthermore, all particular embodiments of the invention are amenable for use with a multi-position sensing system which comprises many sensors, all of which feed signals to a single station for analysis. Such a configuration can reduce costs by obviating the need for separate analyzers for each sensor, and can increase reproducibility between sensors by having all signals analyzed by the same instrument.

BRIEF DESCRIPTION OF THE DRAWINGS

Further objects of the invention, together with additional features contributing thereto and advantages accruing therefrom will be apparent from the following description of a preferred embodiment of the invention which is shown in the accompanying drawings, which are incorporated in and form a part of the Specification. In the drawings.

DETAILED DESCRIPTION OF THE INVENTION

Reference will now be made in detail to the present embodiment of the invention, examples of which are illustrated in the accompanying drawings.

In accordance with the present invention a method and apparatus are provided for remote temperature sensing via in situ fluorescent probes optically connected to an excitation source and a detection system by a single fiber optic. The crux of the present invention is coupling the use of signals which are independent of excitation beam intensity with the use of temperature probe materials and shapes that are, respectively, chemically highly impervious and optically efficient.

Figure 1:
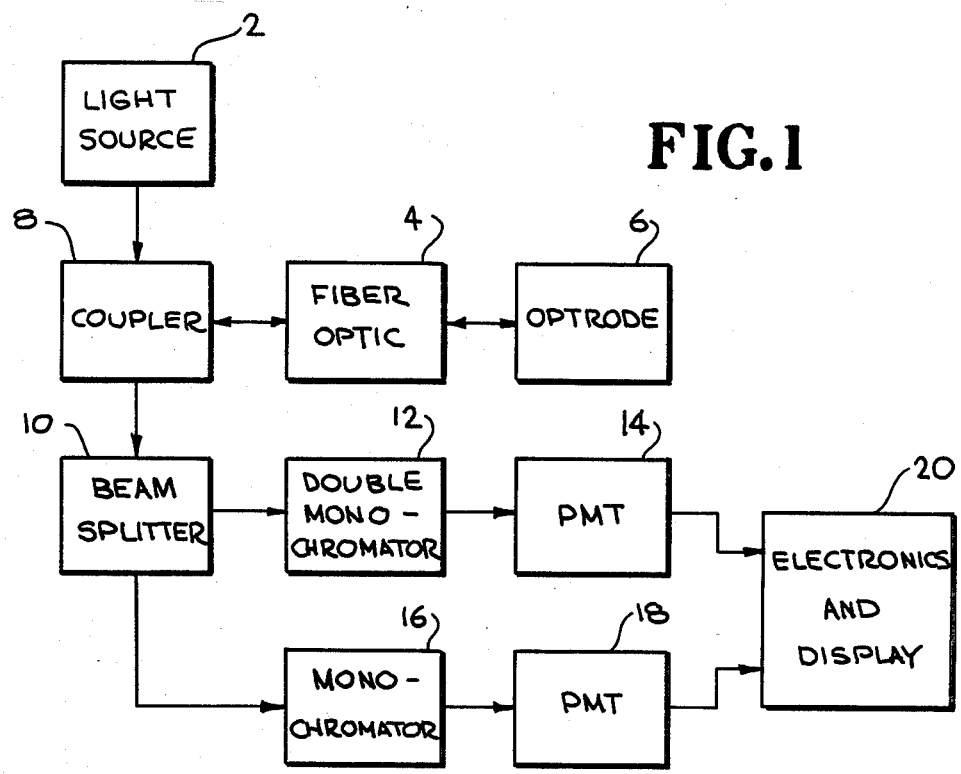
FIG. 1 diagrammatically illustrates a system for obtaining fluorometric and Raman scatter information from a single remote location in accordance with the present invention.

By way of illustration, FIG. 1 shows a block diagram of a detection means configuration, a light source 2, a fiber optic 4, and a temperature probe 6 for an embodiment employing a single optrode. In this embodiment the detection means comprises coupler 8 for separating the outgoing illumination (or excitation) beam from the incoming optical signal; beam splitter 10 which divides the signal so that fluorescence intensity and Raman backscatter intensity can be determined separately and substantially simultaneously; double monochromator 12 and photomultiplier tube 14 for determining Raman backscatter; monochromator 16 and photomultiplier tube 13 for determining optrode fluorescence; and an electronics and display means 20 for processing and displaying the signals. An optical signal is produced by optrode 6, passes through fiber optic 4, and is directed to beam splitter 10 by coupler 8. Part of the optical signal proceeds from beam splitter 10 to double monochromator 12 where the portion of the optical signal corresponding to Raman scattered light from fiber optic 4 is directed to photomultiplier tube 14. Photomultiplier tube 14 generates an electrical signal related to the intensity of the Raman scattered light. This electrical signal is processed and displayed by electronics and display means 20. The other part of the optical signal proceeds from beam splitter 10 to monochromator 16 where the portion of the optical signal corresponding to the fluorescent intensity of the optrode 6 is directed to photomultiplier 18. Photomultiplier tube 18 generates an electrical signal related to the intensity of the fluorescent emissions generated by optrode 6. The electrical signal is processed and displayed by electronics and display means 20. The double monochromator 12 and photomultiplier tube 14 are components used in ordinary Raman spectroscopy as illustrated in chapter two, "Experimental Methods", from Tobin, *Laser Raman Spectroscopy* (Wiley-Interscience, 1971). Accordingly, this chapter is incorporated by reference. The components for fluorescent intensity measurements are also well-known in the art; in particular, U.S. patent application Ser. No. 194,684 filed Oct. 6, 1980 and entitled "Remote Multi-Position Information System and Method", discloses fluorescent detection means suitable for use in accordance with the present invention. Accordingly, U.S. patent application Ser. No. 194,684 is incorporated by reference.

In accordance with the invention, the ratio of the intensity of Raman scatter from the fiber optic and the fluorescent intensity of a fluorescent solid is determined. The two intensities making up the ratio are those corresponding to a common illumination beam frequency. The value of the measured ratio is compared to ratios on a predetermined table, which relates such intensity ratios to temperature for each kind of fluorescent solid and for the particular illumination beam frequency employed. Operationally, such a tabular relationship is stored on a data acquisition computer, such as a DEC LSI-11 (Digital Equipment Corp. Waltham, Mass.). Temperatures are determined by an interpolation scheme implemented by the computer. Such utilization of the Raman scatter intensity will be referred to as the Raman reference means.

An analogous procedure is followed when intensity ratios of separate fluorescent emission lines are employed. Namely, once an intensity ratio is measured, temperature is interpolated automatically from predetermined intensity ratio-versus-temperature table stored on a small data acquisition computer.

Figure 2:
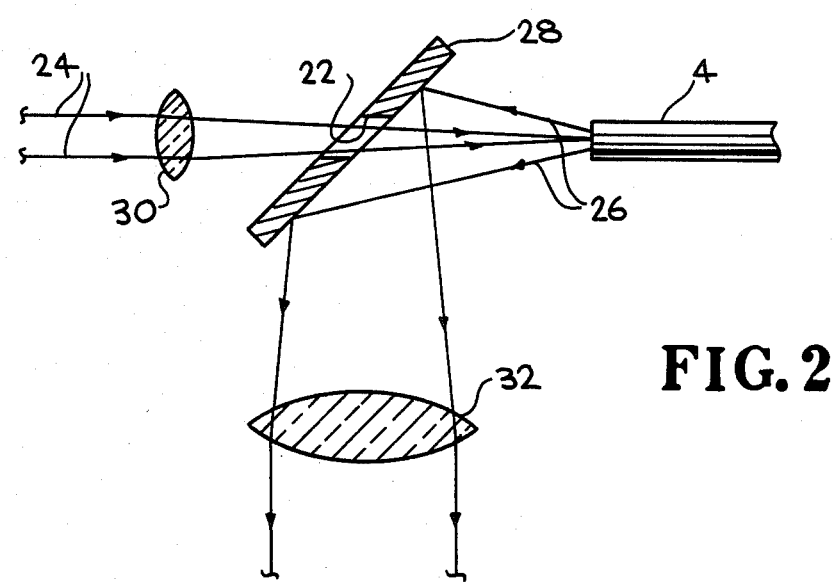
FIG. 2 is an embodiment of a coupler arrangement suitable for use with the present invention.

Coupler 8 allows a single fiber to be used both for transmitting the illumination beam to optrode 6 and for collecting signals from the optrode and fiber optic. FIG. 2 is an example of one coupler arrangement which is used in accordance with the present invention. Illumination beam 24 is directed into a first end of fiber optic 4 by lens 30. Lens 30 focuses beam 24 through an aperture 22 in mirror 28. Light 26 exiting the fiber optic is reflected by mirror 28 to collection lens 32.

Simpler detection means configurations are possible, and in some cases preferred, for example, in embodiments of the invention which do not utilize Raman backscatter as a reference signal. Where intensities of multiple emission lines from the fluorescent solid are the only parameters measured, the double monochromator may be replaced by a single monochromator, or both monochomators may be replaced by a system of beam splitters and filters depending on the nature of the fluorescent emissions and the conditions to which the optrode is subjected.

Figure 3:
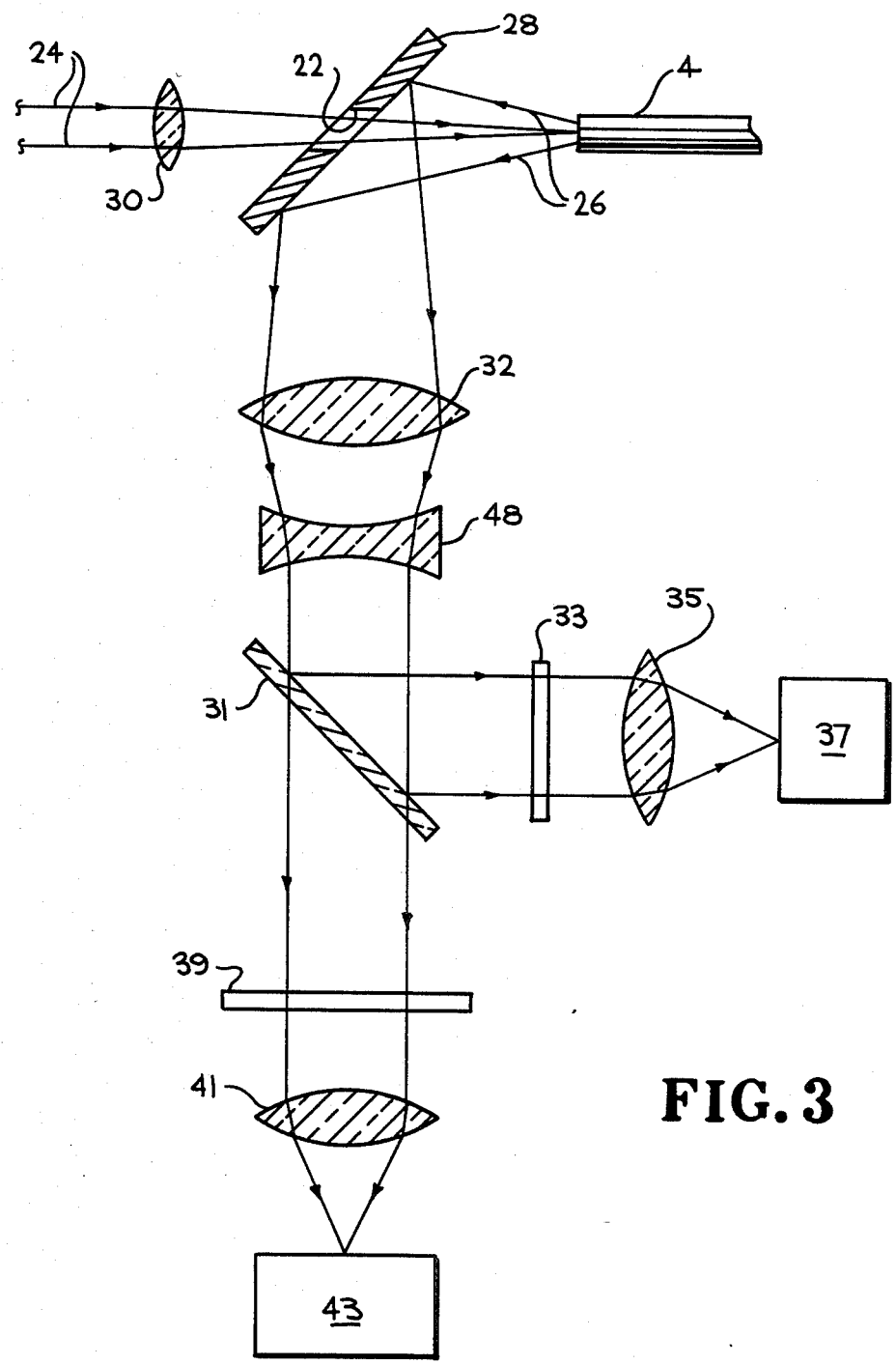
FIG. 3 is an embodiment of a double-filter/spacial filter combination suitable for use with some embodiments of the present invention.
Figure 4:
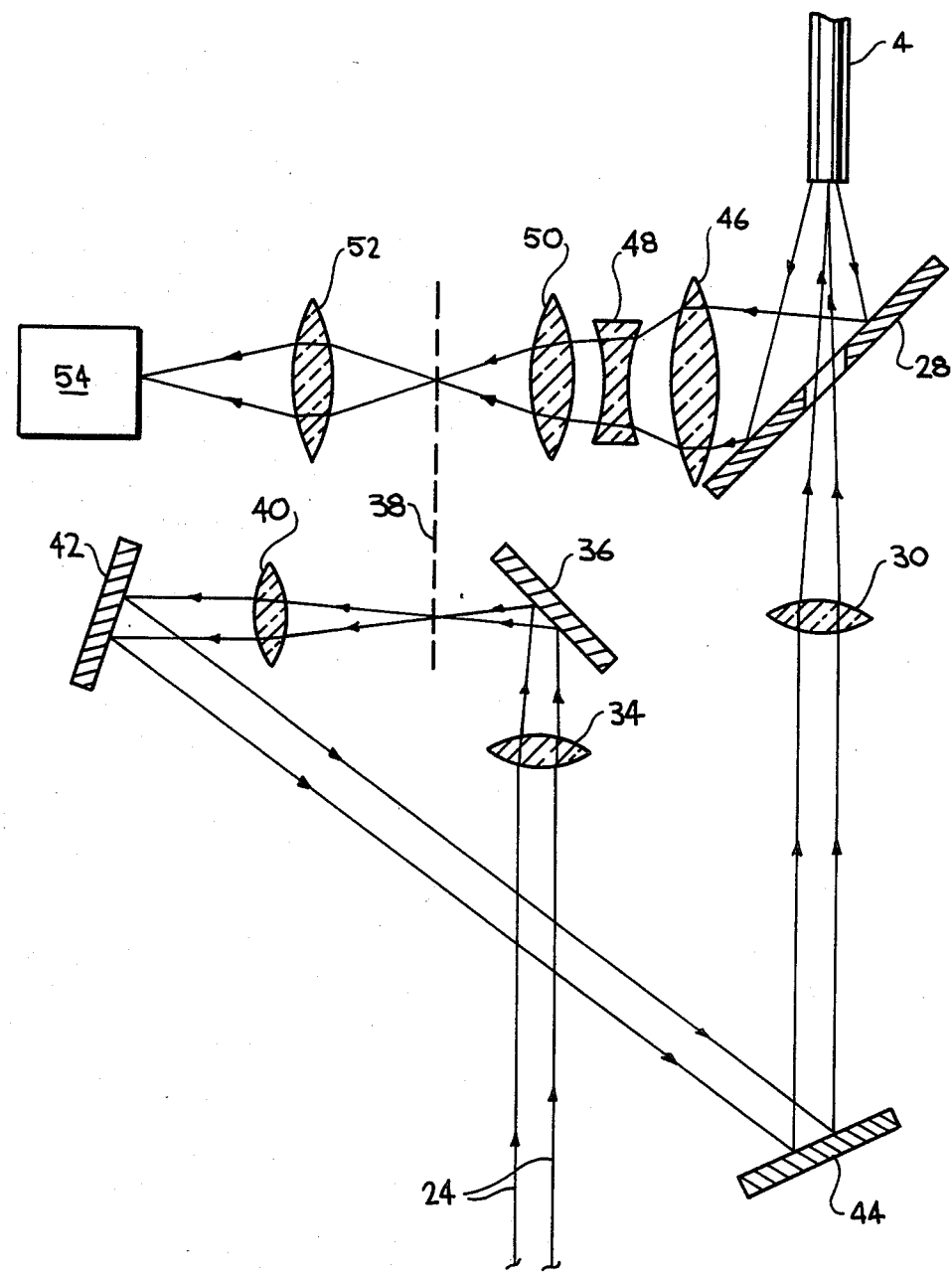
FIG. 4 illustrates a configuration incorporating a mechanical chopper for measuring fluorescent lifetimes in accordance with some embodiments of the present invention.

An example of a double-filter configuration for analyzing intensity ratios is illustrated in FIG. 3. This example employs the coupler shown in FIG. 2. After beam 26 passes through collection lens 32 it is collimated by lens 48 and is split by beam splitter 31. One portion of beam 26 passes through filter 33 and is focused by lens 35 onto photodetector 37. The other portion of beam 26 passes through filter 39 and is focused by lens 41 onto photodetector 43.

Where fluorescent lifetimes are measured still other detection-means configurations are necessary. By way of example, FIG. 4 illustrates a configuration incorporating a mechanical chopper for measuring fluorescent lifetimes. Illumination beam 24 is focused by lens 34 and deflected by mirror 36 so that a chopper blade 38 interrupts the beam at its focal point. The beam is then recollimated by lens 40 and deflected by mirrors 42 and 44 for injection into fiber optic 4. Lens 30 focuses the beam for injection. Light 26 exiting the fiber optic is separated from the injected beam by a coupler, in particular, apertured mirror 28. Light 26 exiting the fiber optic and separated from the illumination beam is collected, collimated, and focused by lenses 46, 48, and 50, respectively. The focus of the beam is located in the path of the chopper blade 38. Lens 52 then focuses the beam to monochrometer 54.

The class of fluorescent solids best suited for use in accordance with the present invention are those selected from solid-state laser materials. Other materials may be used, but the ruggedness and intense fluorescence of the solid-state laser materials makes them a preferred class. Crystalline laser materials are preferred among the solid-state laser materials because of their superior thermal conductivity, sharper fluorescence emission lines, and higher melting points than, for example, laser glasses. However, laser glasses may be preferred for particular applications. Generally, solid-state laser materials suitable for use in accordance with the present invention may be selected from the materials described by Koechner in *Solid State Laser Engineering* (Springer-Verlag, 1976). Accordingly, chapter two, entitled "Properties of Solid-State Laser Materials", is incorporated by reference. Generally, these materials include rare earth and transition metal-doped glasses and crystals. The preferred host crystals are sapphire and garnet, the latter being available in several suitable forms, such as yttrium aluminum (YAG), yttrium gallium, gadolinium gallium, and gadolinium scandium aluminum. These materials comprise the temperature probe which is attached to the second end of the fiber optic, that is, the end placed adjacent to the region whose temperature is to be determined.

Figure 5:
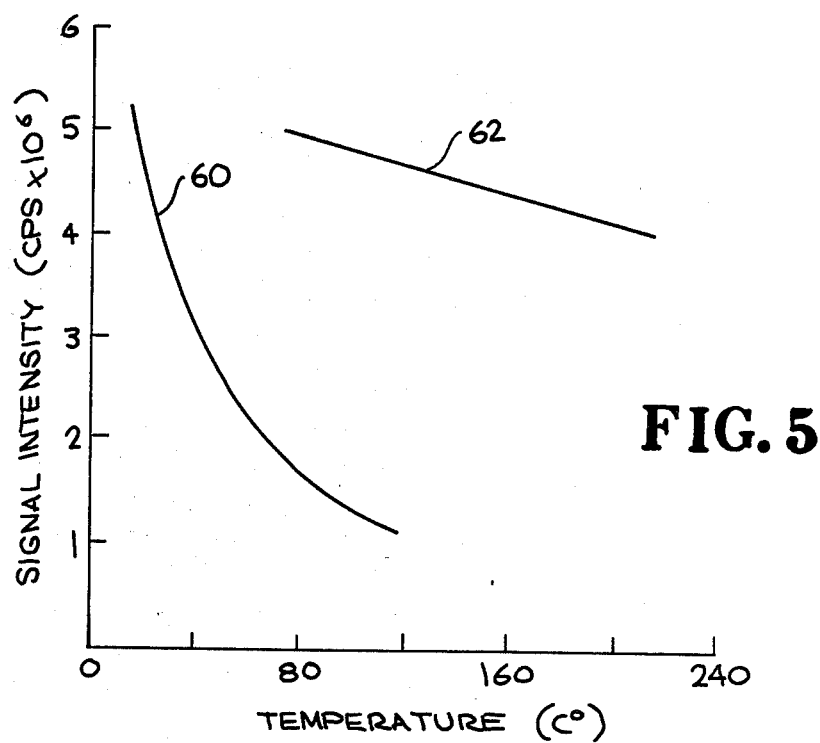
FIG. 5 is a graph which contains signal intensity-versus-temperature calibration curves for temperature probes made of chromium-doped glass and neodymium-doped glass.

By way of example, FIG. 5 illustrates the signal intensity-versus-temperature relationships for chromium-doped glass 60 and neodymium-doped glass 62. Neodymium and chromium glass fibers were worked into 200-220 $\mu$m fibers about $1\frac{1}{2}$ inches long and installed with silicone potting compound in an AMP fiber optic terminator (General Fiber Optics, Calwell, N.J.). The active end of the fiber was then submerged in the reservoir of an apparatus for capillary melting point determination, which was filled with glycerol. The temperature of the glycerol was determined with partial immersion mercury thermometers. Excitation and signal collection took place over 200 meters of Valtec PC-10 fiber optic (Valtec Optical Group, Waltham, Mass.). The optrodes were illuminated by an Argon laser operating at 514 nm and 2 milliwatts. Fluorescence intensities were measured at 875 nm and 850 nm for the chromium-doped and neodymium-doped glasses, respectively.

Figure 6:
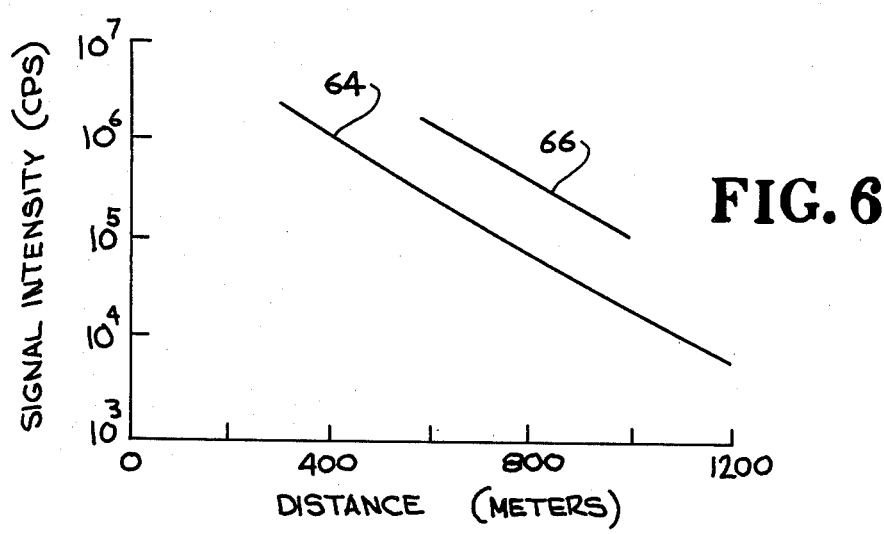
FIG. 6 graphically illustrates signal intensity-versus-distance relationships for non-tapered and tapered probes made of neodymium-doped glass.

FIG. 6 illustrates signal intensity versus fiber optic (Valtec PC-10) length for the neodymium-doped glass optrodes. Curve 64 shows results from the same neodymium-doped fiber as that used to produce the data in FIG. 5, except that the laser is operated at 100 mw and measurements are at room temperature.

Figure 7:
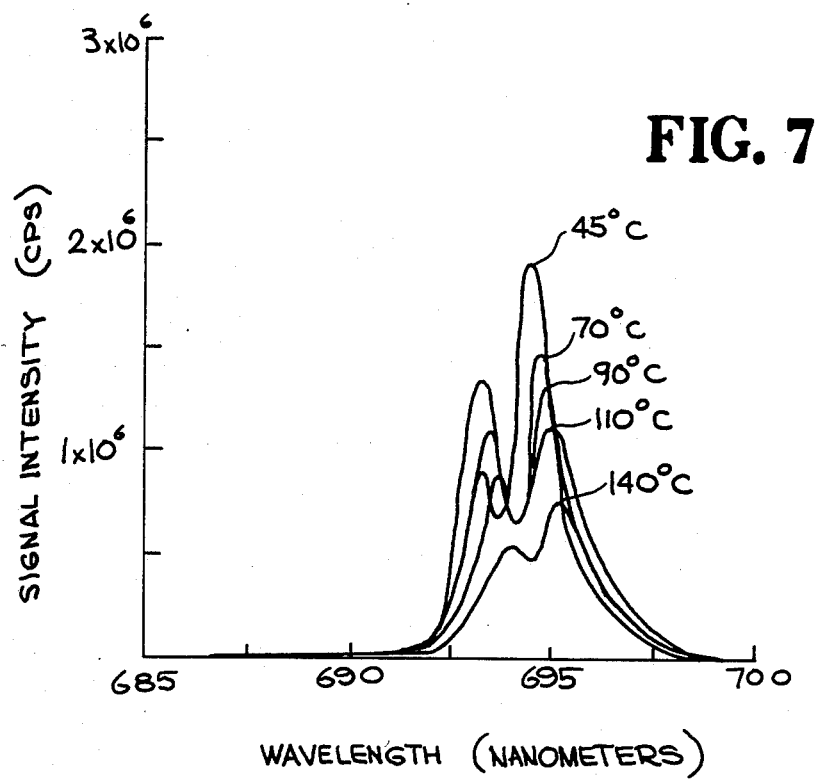
FIG. 7 graphically illustrates the spectrum of ruby fluorescence at five different temperatures when the probe was illuminated by 12 milliwatts of 514.5 nanometer light.

Ruby is the preferred solid-state laser crystal for use in accordance with the present invention. FIG. 7 illustrates the fluorescent spectrum of ruby in the region of the $R_1$ and $R_2$ emission lines for five different temperatures. Here a ruby rod was mounted in a furnace and excited with 12 mw of 514 nm laser light. Signal collection took place over 200 meters of Valtec PC-10 fiber optic. For long distance operation excitation with a Helium-Neon laser is preferred because of lower fiber losses at 633 nm.

Figure 8:
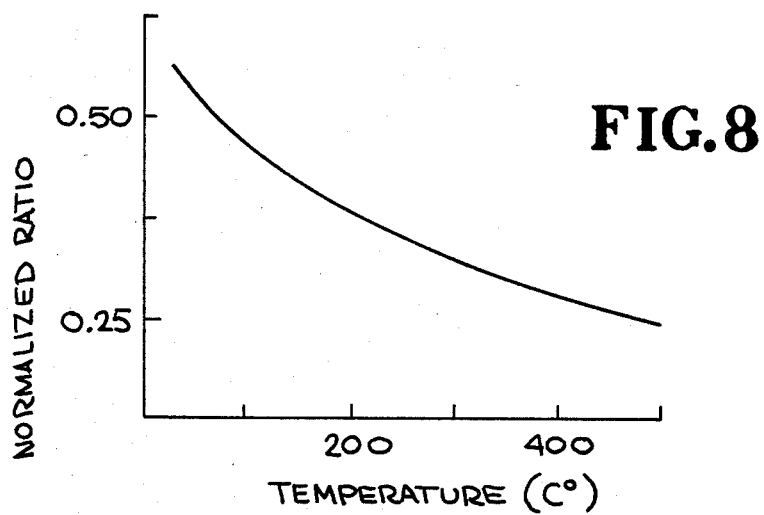
FIG. 8 graphically illustrates the temperature dependence of the intensity ratio of the $R_1$ and $R_2$ emission lines of ruby.

FIG. 8 shows how the ruby $R_2 - R_1$ emission line intensity ratio varies with temperature. The normalized ratio was obtained with a dual filter arrangement similar to the one illustrated in FIG. 3. That is, filters were chosen so that $R_1$ intensity was taken as the total intensity of light at wavelengths longer than that of the midway point between the $R_1$ and $R_2$ peaks, and $R_2$ intensity was taken as the total intensity of light at wavelengths shorter than that of the midway point between the $R_1$ and $R_2$ peaks. The $R_1$ intensity was assigned unit value and the $R_2$ intensity was measured relative to this value. Although the response of ruby extends out to about 1000° C., the current practical limit for operability is about 500° C. The limitation arises primarily from the lack of available high-temperature cements for the interface between the ruby optrode and the long-distance fiber optic.

An alternative embodiment of the ruby-based optrode is provided by a sapphire fiber whose tip has been doped by exposure to $Cr_2O_3$ and $Fe_2O_3$. One effect of the iron is to reduce fluorescent lifetime thereby increasing the optrode's ability to respond to rapid fluctuations in ambient temperature. Even though iron also decreases fluorescent intensity, response times of 10–100 $\mu$sec are obtained over several hundred meters of fiber optic (Valtec PC-10) for a 633 nm illumination beam. These results are obtained with a 250 $\mu$m sapphire fiber which is doped by exposure to an 80% $Al_2O_3$, 10% $Cr_2O_3$, 10% Fe mixture at 1500° C. for 2 hours. Generally, the preferred dopant concentration ranges are 0.5–5% for Cr, and 0.01–5% for Fe, dependent on the desire response range. Sapphire doped within these ranges is referred to as ruby counter-doped with ferric ions. As indicated above, the iron decreases fluorescent intensity by its quenching effect. Thus, as iron concentration is increased, the ability to monitor fluorescent emissions over very long fiber optics is correspondingly reduced. In this embodiment of the ruby-based optrode, temperature may be determined either from fluorescent intensity ratios from fluorescence/Raman intensity ratios, or from fluorescence lifetimes. In the latter case, a pulsed light source is required. Temperature is determined by relating measured fluorescence lifetimes with predetermined tabulated values and their corresponding temperatures.

The shape and form of the fluorescent solid employed in the optrode are critical for efficient long distance temperature measurements. First, it is critical that the material be in the form of a single, or integral, piece, as opposed to, for example, a compressed or sintered powder or collection of granules. The preferred form of material is referred to as an integral fluorescent solid, or more particularly an integral solid-state laser material. The integral form minimizes losses and heating from light scattering, has superior thermal conductivity than non-integral forms, is excited more efficiently than non-integral forms, and facilitates efficient coupling to a fiber optic. Second, the most efficient, and preferred, shape of the fluorescent solid is that of a tapered cylinder (see FIG. 9B). That is, the preferred shape has a single axis of symmetry that will be referred to as the longitudinal axis (86 in FIG. 9B). The intersection of any plane perpendicular to the longitudinal axis and the preferred shape is radially symmetric about the longitudinal axis, i.e., cross-sections along the longitudinal axis are disk-shaped. The taper of the preferred shape proceeds monotonically from a wide end, referred to as the proximal end (84 in FIG. 9B), to a narrow end, referred to as the distal end (82 in FIG. 9B). In particular, a taper is preferred that is substantially parabolic in character. The proximal end face of the preferred shape is perpendicular to the longitudinal axis and is substantially the same diameter as the core (see 5 in FIGS. 9A and 9B) of the fiber optic to which it is attached, although a proximal end face diameter a few percent more or less than the core diameter still enhances collection efficiency.

The longitudinal axis of the probe (86 in FIG. 9B) and the longitudinal axis of the fiber optic (also 86 in FIG. 9B) must be substantially coaxial. It is preferred that the distal end 82 in FIG. 9B be rounded with a radius less than half the diameter of the proximal end.

Figure 9:
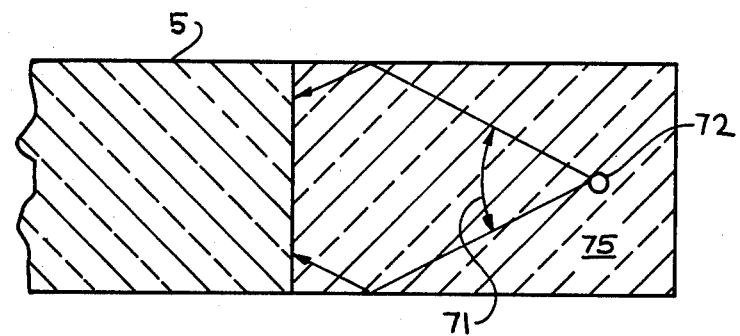
FIG. 9A shows a non-tapered temperature probe and diagrammatically illustrates the solid angle over which an attached fiber optic collects fluorescence emitted from a particular point within the probe.
FIG. 9B shows an example of the preferred shape of the temperature probe and diagrammatically illustrates the solid angle over which an attached fiber optic collects fluorescence from a particular point within the probe.
Figure 9:
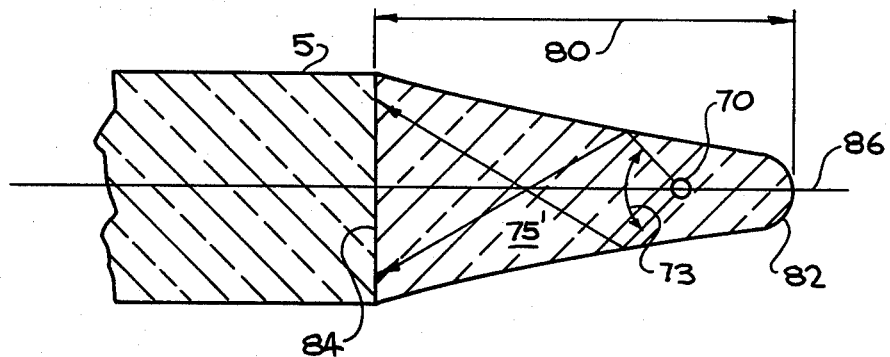

FIGS. 9A and 9B illustrate the principle by which the preferred shape of fluorescent solid 75' enhances signal collection efficiency. Enhanced collection of fluorescence emissions occurs because internal reflection off the tapered walls of the solid decreases the angle of entry into the fiber optic. Thus, a greater solid angle of emissions is collected from an emitter 70 in a tapered solid (see FIG. 9B) than a similarly located emitter 72 in a non-tapered solid (see FIG. 9A). The effect arises because of a property of fiber optics. Light collected by a fiber optic is transmitted essentially loss free along the length of the fiber only if it enters the fiber at an angle from the fiber's longitudinal axis (86 in FIG. 9B) which is less than or equal to a particular angle, which is a characteristic of the fiber used. The tapered geometry allows a greater quantity of emitted light rays to enter the fiber optic at angles less than or equal to the characteristic angle than would occur otherwise. Curve 66 in FIG. 6 illustrates the greater sensitivity achieved by using a parabolically tapered shape for neodymium-doped glass. Experimental conditions for curve 66 are indentical to those for curve 64, except that a tapered fiber of neodymium-doped glass was employed to obtain curve 66. In this example the probe length 80 (FIG. 9B) was approximately 1 centimeter.

In accordance with the subject invention, remote temperature measurements in harsh and inaccessible environments are possible. The method and apparatus of the invention are predicated on the ability to combine monitoring of a suitably chosen internal reference signal, preferably the intensity of Raman backscatter, and a temperature dependent fluorescence signal, with the use of probes constructed from integral solid-state laser materials with a tapered geometry. The increased efficiency afforded by the invention permits temperatures to be monitored over fiber optics hundreds of meters in length.

The descriptions of the foregoing embodiments of the invention have been presented for purposes of illustration and description. They are not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

I claim:

1. A method for sensing temperature and for generating optical signals related to said temperature, the method comprising the steps of:
    (a) providing a fiber optic through which at least one light beam from at least one associated light source is transmitted from a first end of the fiber optic to a second end of the fiber optic;
    (b) providing an integral fluorescent solid illuminated by at least one light beam from the one or more associated light sources, the integral fluorescent solid further having a shape which is radially symmetric about a longitudinal axis and having a surface which is tapered along the longitudinal axis from a proximal end to a distal end, the proximal end having a diameter substantially the same as the diameter of the core of the fiber optic, and the proximal end being attached to the second end of the fiber optic such that the longitudinal axis of the integral fluorescent solid is substantially coaxial to the longitudinal axis of the fiber optic;
    (c) sensing fluorescence produced by the integral fluorescent solid and collected and transmitted by the same fiber optic used to transmit light beams from the one or more associated light sources; and
    (d) determining temperature from a predetermined fluorescence-versus-temperature relationship for the integral fluorescent solid.

2. The method as recited in claim 1 wherein the fluorescent spectrum of said integral fluorescent solid includes a plurality of emission lines whose relative intensities vary with temperature, and wherein said step of detecting comprises measuring the relative intensities of at least two of the plurality of emission lines produced by said integral fluorescent solid, and said step of determining temperature comprises looking up temperature from a predetermined fluorescent intensity ratio-versus-temperature relationship for said integral fluorescent solid.

3. The method as recited in claim 1 wherein said at least one associated light source generates light pulses of predetermined duration, and wherein said step of sensing comprises measuring fluorescence lifetime, and said step of determining temperature comprises looking up temperature from a predetermined fluorescence lifetime-versus-temperature relationship for said integral fluorescent solid.

4. An apparatus for sensing temperature and for generating optical signals related to said temperatures, the apparatus comprising:
(a) a fiber optic having a core through which at least one beam of light from at least one associated light source is transmitted from a first end of the fiber optic to a second end of the fiber optic;
(b) an integral fluorescent solid illuminated by at least one light beam from the at least one associated light source, the integral fluorescent solid further having a shape which is radially symmetric about a longitudinal axis and having a surface which is tapered along the longitudinal axis from a proximal end to a distal end, the proximal end having a diameter substantially the same as a diameter of the core of the fiber optic and greater than a diameter of the distal end, and the proximal end being attached to the second end of the fiber optic such that the longitudinal axis of the integral fluorescent solid is substantially coaxial to a longitudinal axis of the fiber optic; and
(c) detection means for measuring the fluorescence produced by the integral fluorescent solid and collected and transmitted by the same fiber optic used to transmit at least one light beam from the at least one associated light source, the detection means being operationally associated with the first end of the fiber optic.

5. The apparatus as recited in claim 4 wherein said integral fluorescent solid is an integral solid-state laser material.

6. The apparatus as recited in claim 5, wherein said integral solid-state laser material comprises rare earth- and transition metal-doped glasses.

7. The apparatus as recited in claim 6, wherein said rare earth-and transition metal-doped glasses include neodymium-doped glass.

8. The apparatus as recited in claim 6, wherein said rare earth-and transition metal-doped glasses include chromium-doped glass.

9. The apparatus as recited in claim 5, wherein said integral solid-state laser material comprises rare earth- and transition metal-doped crystals.

10. The apparatus as recited in claim 9, wherein said rare earth-and transition metal-doped crystals include ruby.

11. The apparatus as recited in claim 9, wherein said rare earth-and transition metal-doped crystals included ruby countered doped with ferric ions.

12. The apparatus as recited in claim 9, wherein said rare earth-and transition metal-doped crystals include neodymium-doped yttrium aluminum garnet.

13. The apparatus as recited in claim 4, wherein the fluorescent spectrum of said integral fluorescent solid includes a plurality of emission lines whose relative intensities vary with temperature, said detection means includes means for measuring the relative intensities of at least two of the plurality of emission lines produced by said integral fluorescent solid, and said surface of said integral fluorescent solid is substantially parabolically tapered along said longitudinal axis of said integral fluorescent solid.

14. The apparatus as recited in claim 13, wherein said integral fluorescent solid is ruby.

15. The apparatus as recited in claim 13, wherein said integral fluorescent solid is ruby counter-doped with ferric ions.

16. The apparatus as recited in claim 13, wherein said at least one associated light source is a laser.

17. The apparatus as recited in claim 4, wherein said at least one associated light source generates light pulses of predetermined duration, and wherein said detection means includes means for measuring fluorescence lifetime.

18. The apparatus as recited in claim 17, wherein said integral fluorescent solid is ruby counter-doped with ferric ions.

19. A method for sensing temperature and for generating optical signals related to said temperature, the method comprising the steps of:
(a) providing a fiber optic through which at least one light beam from at least one associated light source is transmitted from a first end of the fiber optic to a second end of the fiber optic;
(b) providing an integral fluorescent solid illuminated by at least one light beam from the one or more associated light sources, the integral fluorescent solid further having a shape which is radially symmetric about a longitudinal axis and having a surface which is tapered along the longitudinal axis from a proximal end to a distal end, the proximal end having a diameter substantially tne same as the diameter of the core of the fiber optic, and the proximal end being attached to the second end of the fiber optic such that the longitudinal axis of the integral fluorescent solid is substantially coaxial to the longitudinal axis of the fiber optic;
(c) measuring the intensity of the fluorescence produced by the integral fluorescent solid and collected and transmitted by the same fiber optic used to transmit light beams from the one or more associated light sources;
(d) detecting the intensity of Raman scattered light emanating from said fiber optic due to said at least one light beam from said at least one associated light source;
(e) monitoring the ratio of the intensity of the Raman scattered light and the ratio of intensity of said fluorescence, the two intensities substantially corresponding to the common illumination beam frequency generated by said at least one associated light source; and
(f) determining temperature from a predetermined ratio-versus-temperature relationship for said integral fluorescent solid and for said illumination beam frequency.

20. An apparatus for sensing temperature and for generating optical signals related to said temperature, the apparatus comprising:
(a) a fiber optic having a core through which at least one beam of laser light from at least one associated light source is transmitted from a first end of the fiber optic to a second end of the fiber optic;

(b) an integral fluorescent solid illuminated by at least one light beam from the at least one associated light source, the integral fluorescent solid further having a shape which is radially symmetric about a longitudinal axis and having a surface which is substantially parabolically tapered along the longitudinal axis from a proximal end to a distal end, the proximal end having a diameter substantially the same as the diameter of the core of the fiber optic, and the proximal end being attached to the second end of the fiber optic such that the longitudinal axis of the integral fluorescent solid is substantially coaxial to the longitudinal axis of the fiber optic;

(c) Raman reference means for measuring the intensity of Raman scattered light emanating from said fiber optic due to light transmitted from said at least one associated light source, said Raman reference means being operationally coupled to said first end of said fiber optic; and (d) detection means for measuring the fluorescence produced by the integral fluorescent solid and collected and transmitted by the same fiber optic used to transmit at least one light beam from the at least one associated light sources, said detection means being operationally coupled to the first end of said fiber optic.

21. A method for sensing temperature and for generating optical signals related to said temperature, the method comprising the steps of:

(a) providing a fiber optic through which at least one light beam from at least one associated light source is transmitted from a first end of the fiber optic to a second end of the fiber optic;

(b) providing an integral fluorescent solid illuminated by at least one light beam from the one or more associated light sources, the integral fluorescent solid further having a shape which is radially symmetric about a longitudinal axis from a proximal end to a distal end, the proximal end having a diameter substantially the same as the diameter of the core of the fiber optic, and the proximal end being attached to the second end of the fiber optic such that the longitudinal axis of the integral fluorescent solid is substantially coaxial to the longitudinal axis of the fiber optic;

(c) measuring the intensity of the fluorescence produced by the integral fluorescent solid and collected and transmitted by the same fiber optic used to transmit light beams from the one or more associated light sources;

(d) determining temperature from a predetermined ratio-versus-temperature relationship for said integral fluorescent solid and for said illumination beam frequency.

22. An apparatus for sensing temperature and for generating optical signals related to said temperature, the apparatus comprising:

(a) a fiber optic having a core through which at least one beam of laser light from at least one associated light source is transmitted from a first end of the fiber optic to a second end of the fiber optic;

(b) an integral fluorescent solid illuminated by at least one light beam from the at least one associated light source, the integral fluorescent solid further having a shape which is radially symmetric about a longitudinal axis from a proximal end to a distal end, the proximal end having a diameter substantially the same as the diameter of the core of the fiber optic, and the proximal end being attached to the second end of the fiber optic such that the longitudinal axis of the integral fluorescent solid is substantially coaxial to the longitudinal axis of the fiber optic;

(c) detection means for measuring the fluorescence produced by the integral fluorescent solid and collected and transmitted by the same fiber optic used to transmit at least one light beam from the at least one associated light sources, said detection means being operationally coupled to the first end of said fiber optic.

* * * * *